United States Patent [19]

Iwane

[11] Patent Number: 5,745,804
[45] Date of Patent: Apr. 28, 1998

[54] AUTOMATIC FOCUS DEVICE

[75] Inventor: Toru Iwane, Yokohama, Japan

[73] Assignee: Nikon Corporation, Tokyo, Japan

[21] Appl. No.: 763,341

[22] Filed: Dec. 11, 1996

Related U.S. Application Data

[63] Continuation of Ser. No. 441,936, May 16, 1995, abandoned.

[30] Foreign Application Priority Data

May 31, 1994 [JP] Japan .................................. 6-154109

[51] Int. Cl.⁶ ........................................................ G03B 3/00
[52] U.S. Cl. ............................... 396/93; 396/89; 396/79
[58] Field of Search ................................ 396/79, 82, 89, 396/91, 93

[56] References Cited

U.S. PATENT DOCUMENTS 4,560,864  12/1985  Kinoshita et al. ................ 250/201
4,728,980   3/1988  Nakamura et al. ............... 354/402
4,837,594   6/1989  Nakamura et al. ............... 354/402
4,931,820   6/1990  Matsuzawa et al. .............. 354/402

*Primary Examiner*—Daniel P. Malley
*Attorney, Agent, or Firm*—Oliff & Berridge, PLC

[57] ABSTRACT

An automatic focus device capable of optimum focus lens driving control corresponding to the magnitude of the positional error of the focus lens. The automatic focus device specifies the target position of the focus lens based on information relating to the defocus distance of the focus lens, the velocity of the subject image, the current position of the focus lens and controls the driving power of the focus lens based on non-linear functions of the positional error defined as the difference between the target position and the current position of the focus lens.

16 Claims, 4 Drawing Sheets

AUTOMATIC FOCUS DEVICE

This is a Continuation of application Ser. No. 08/441,936 filed May 16, 1995, now abandoned.

BACKGROUND OF THE INVENTION

1. Field of the Invention

This invention relates generally to automatic focus devices. In particular, this invention relates to non-linear control of a focus lens based on the lens position error.

2. Description of Related Art

Conventional automatic focus devices use a driving method known as proportional, integral, derivative, (PID) control for controlling the position of a focus lens based on such information as the current position of the focus lens, the distance the focus lens must travel to focus an image on the film plane (the defocus distance), and the velocity of the plane on which the image is focussed (the image plane velocity). In conventional PID control, the driving signal sent to the focus lens driver is generated from a linear combination of the positional error of the focus lens obtained from the above parameters and the integral value of the positional error. The positional error is defined as the difference between a target position of the lens and the current position of the lens. The target position is a predicted ideal lens position where the image of a subject is focussed onto the film plane.

FIG. 1 is a block diagram of a conventional automatic focus device. The control means 102 controls the motor 104 and the focus lens 108 so an image is focussed on the film plane 109. This conventional automatic focus device detects the defocus distance of the focus lens 108 with the defocus distance detector 101 and uses either a predetermined image plane velocity or determines the image plane velocity in the control means 102. The current position of the focus lens 108, which is embedded in the shooting lens 107, is obtained from the lens position detection means 103 by the control means 102. The current velocity of the focus lens 108 is obtained from a plurality of pulses output by the position detection means 103, which the control means 102 converts to values having the same dimensions as the image plane velocity. Based on these values, the control means 102 determines the positional error $\Delta X$ as the difference between the current lens position and a target lens position and determines the velocity error $\Delta V$ as the difference between the current lens velocity and the image plane velocity. The driving power of the control signal sent to the motor 104 is obtained from the positional error $\Delta X$ and the velocity error $\Delta V$ as given by Eq. 1:

$$P = \alpha \Delta V + \beta \Delta X + \gamma \int \Delta x \, dt \quad (1)$$

Where $\Delta V$ is the velocity error, $\Delta X$ is the positional error, t is the time in seconds and $\alpha$, $\beta$, and $\gamma$ are constants.

The control operation described above is repeated at regular time intervals and the focus lens position is adjusted to follow a moving subject. FIG. 2 graphically shows how the focus lens 108 moves in response to a moving subject. Locus g3 indicates the ideal position of the focus lens 108 when following the moving subject, while locus g4 indicates the actual change in position of the focus lens 108. The ideal position of the focus lens 108 is where the image is focussed on the film plane 109. The vertical space between loci g3 and g4 corresponds to the positional error $\Delta X$ of the focus lens 108 which is due to delays in detecting the defocus distance. The defocus distance is detected approximately every 50–100 milliseconds due to restrictions on the charge storage in the sensor used in detecting the defocus distance and the time required for charge transfer in the sensor. On the other hand, the output interval of the focus lens 108 position and the control signal to the motor 104 is several milliseconds. Therefore, while detection of the defocus distance is executed once, control of the motor 104 is executed at least 10 times.

Thus, when controlling the motor 104 to follow a moving subject, it is theoretically known that a stationary delay occurs when controlling the focus lens 108. This is because the control means 102 controls the focus lens 108 at least ten times using an inaccurate defocus distance value. The magnitude of this delay is inversely proportional to the constant $\beta$ associated with the positional error $\Delta X$. If this delay exceeds the subject depth of the shooting lens in the camera, an out-of-focus condition occurs. Furthermore, this control delay tends to increase in direct proportion to the velocity of the subject.

For example, in the case of a single lens reflex camera, especially when continuous shooting is executed, severe conditions such as high lens velocity and intermittent tracking motion occur. This occurs during film exposure as the mirror flips up and light rays entering the lens are directed at the film surface, thus interrupting detecting the defocus distance. This causes an offset error defocus distance to exist at the start of the control cycle, equivalent to the amount of movement of the image plane during the time when the defocus distance cannot be measured. Moreover, if the shooting lens is driven by a motor with gears, indeterminate characteristics such as backlash, which arises when the lens driving direction reverses, interfere with the lens control. Hence, driving the focus lens in the same direction as much as possible without reversing the driving direction is desired. If the same driving direction is maintained, the position of the focus lens can be more quickly established, even if the output of the encoder detecting the position of the focus lens is single-phased. A single-phased encoder has the distinct advantage of reducing the number of electric connectors between the shooting lens and the camera body.

In order to deal with stationary delay, one could increase the constant $\beta$ until the remaining amount of stationary delay satisfies the desired conditions. However, a problem occurs in the approach of the focus lens to the target position if the constant $\beta$, which is associated with the positional error $\Delta X$, is simply made large. The constants $\alpha$, $\beta$ and $\gamma$ are set to optimize tracking for a stationary subject. Hence, changing one or more of these constants, considering only the delay, can cause too much momentum to be created in the focus lens when approaching the vicinity of the target position. Without an ability to execute deceleration control, this may result in a severe overrun condition or the triggering of reverse driving. Also, if the subject is initially in focus, increasing the constant $\beta$ may cause the mechanical system to vibrate. Furthermore, improving Eq. 1 is not sufficient to satisfactorily solve these problems. In other words, because the position gain (the value obtained when the second term is divided by the positional error) always takes the uniform value $\beta$, optimum driving control of the focus lens based on the magnitude of the positional error $\Delta X$ is impossible when using Eq. 1.

Hence, a lens control system capable of handling an offset error defocus distance while driving the lens in only one direction and enabling a smooth and fast focusing condition is required.

SUMMARY OF THE INVENTION

Thus, this invention provides an automatic focusing device which can realize optimum driving control corresponding to the magnitude of the positional error.

Accordingly, the automatic focussing device of this invention is provided by specifying the target position of the focus lens based on the defocus distance of the focus lens, the image plane velocity, and the current position of the focus lens, and by non-linearly controlling the driving power of the focus lens driver based on the positional error of the lens.

Because the driving power is increased or decreased non-linearly, depending on the change in the positional error of the focus lens, optimum driving power is generated. For example, by making the driving power larger as the positional error decreases, the stationary delay of the focus lens during motion of a subject can be improved, realizing a device with improved automatic focus function. This is especially effective in the field of athletic photography and race photography where a moving subject is a given.

BRIEF DESCRIPTION OF THE DRAWINGS

The invention will be described in relation to the following drawings, in which like reference numerals refer to like elements and wherein.

DETAILED DESCRIPTION OF PREFERRED EMBODIMENTS

In describing the means and operation of the present invention, a drawing of an embodiment is used to make the present invention easy to understand, but the present invention is not limited to the embodiment.

Figure 1:
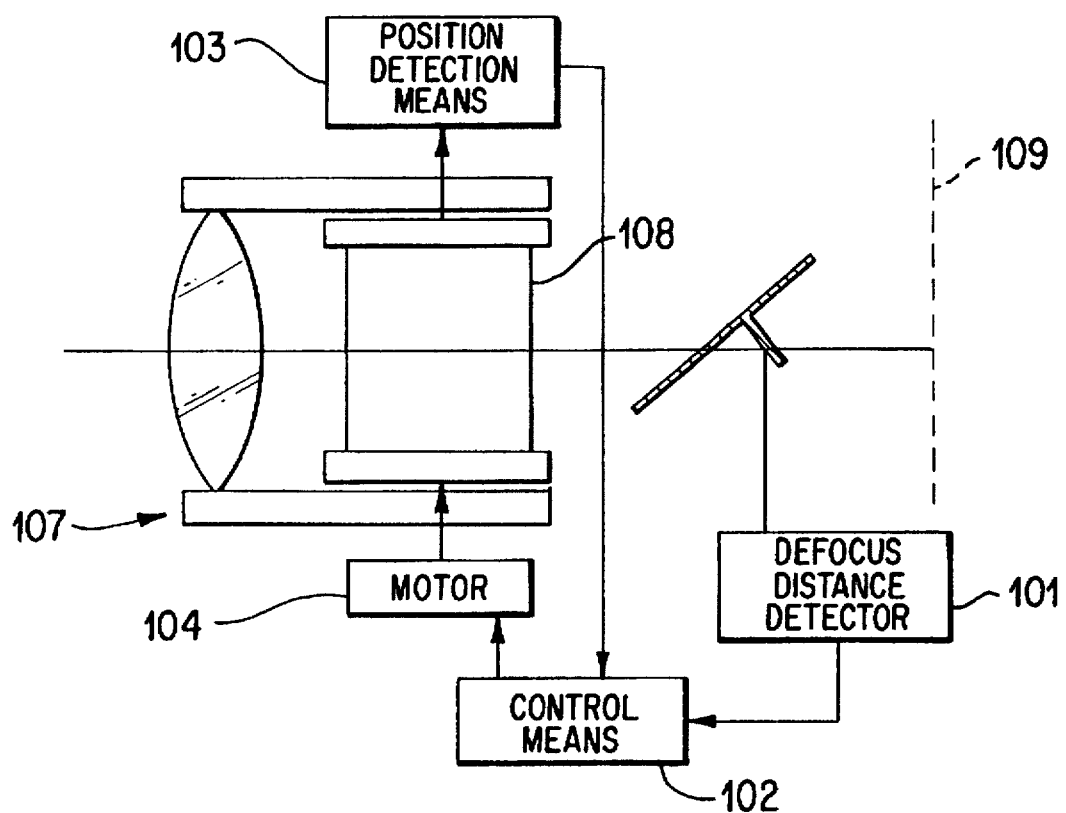
FIG. 1 is a block diagram of a conventional automatic focus device.
Figure 2:
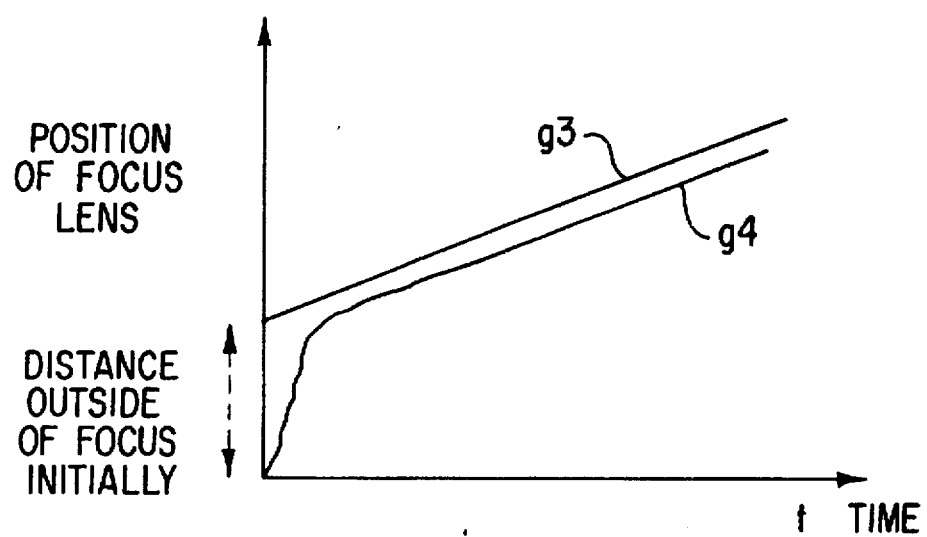
FIG. 2 shows the relationship between the movement of a subject and the defocus amount of the focus lens in the conventional automatic focus apparatus.
Figure 3:
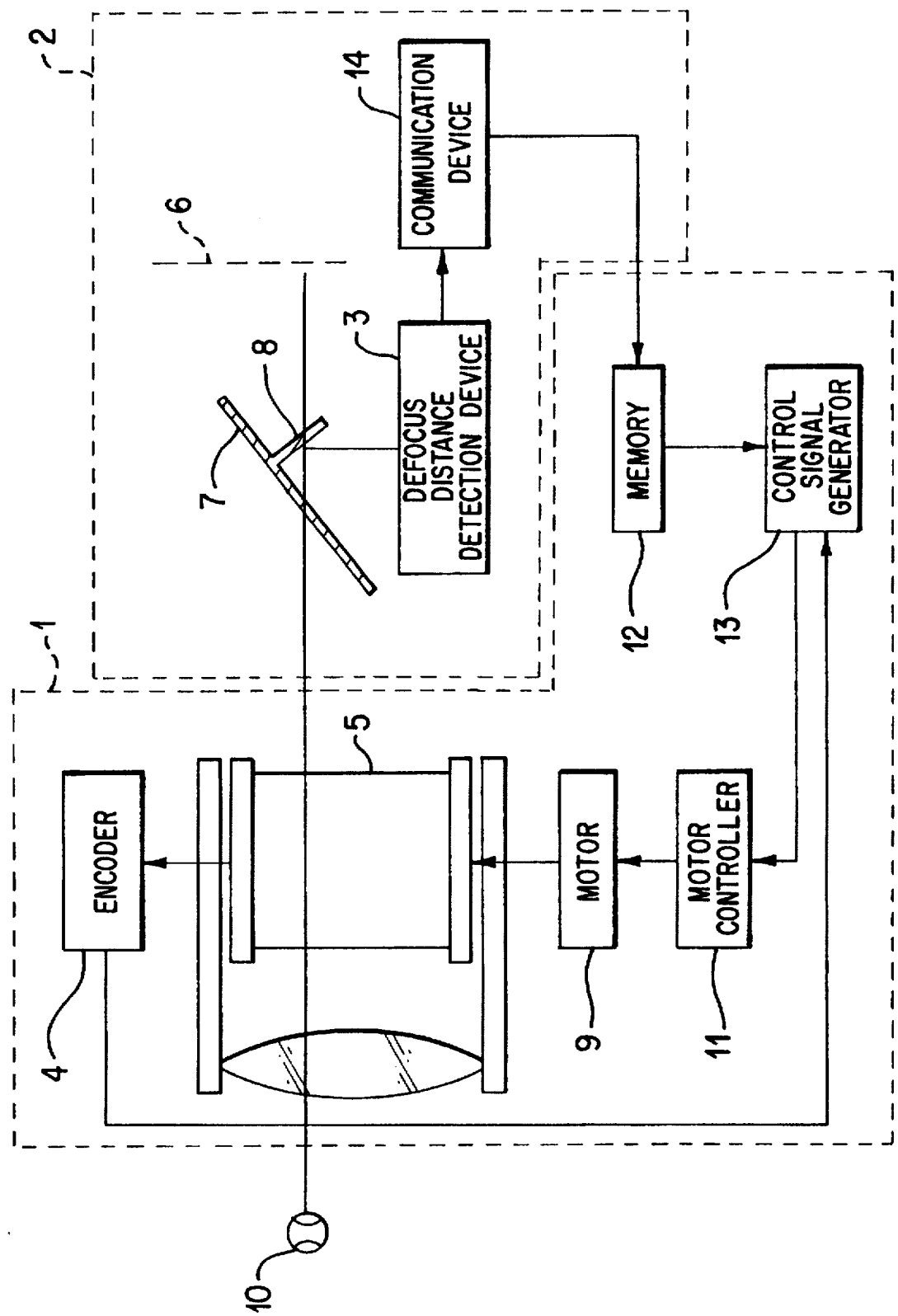
FIG. 3 is a block diagram of a first preferred embodiment of the automatic focus device of this invention.

The block diagram in FIG. 3, shows a shooting lens 1, a camera body 2, a defocus distance detection device 3, which is embedded in the camera body 2, and an encoder 4 to detect the position of the focus lens 5, which is embedded in the shooting lens 1. The encoder 4 is used to detect the position of the focus lens 5 in the present embodiment, but other detection devices, such as a potentiometer, can be used as well.

The focus lens 5 focusses the image of a moving subject 10 at an image plane. The composition plane 6 is the plane where the film or other light-sensitive recording medium is mounted and where the image is ideally focussed. Therefore, the ultimate goal of an automatic focus device is to control the focus lens 5 such that the image plane is always in the same position as the composition plane 6, regardless of how the subject 10 moves.

To control the focus lens 5, a preferred embodiment of the invention determines the defocus distance, or how far the focus lens 5 must move to bring the image plane and composition plane 6 together. During the time when the film is not exposed, part of the light rays from the subject 10 is reflected by a half-silvered mirror 7 and guided to a finder system (not shown), while the other part of the light rays is reflected by a half-silvered mirror 8 and guided to a defocus distance detection device 3.

One type of defocus distance detection device 3, the so-called phase difference detection model, is used in this embodiment of the invention. The phase difference detection model guides a pair of light rays passing through different regions in the exit aperture of the shooting lens 1 and detects a time interval between the pair of images. By this process, the defocus distance detection device 3 detects a value corresponding to the distance separating the image plane from the composition plane 6. This value, the image plane displacement (D), is converted into a defocus distance that the focus lens 5 must move to bring the image plane and the composition plane 6 together. The defocus distance detection device 3 also determines the image plane velocity $V_{im}$ based on the image plane displacement (D) and sends the image plane velocity $V_{im}$ to the control signal generator 13.

The defocus distance detection device 3 detects the image plane displacement (D) of the focus lens 5 at specific time intervals, roughly every 50–100 milliseconds. Therefore, the defocus distance and image plane velocity $V_{im}$ are output to the control signal generator 13 once every 50–100 milliseconds. If the image plane velocity $V_{im}$ and the velocity of the focus lens 5 are linearly related, the image plane velocity $V_{im}$ is determined by the defocus distance detection device 3 as given by Eq. 2 below. The image plane displacement at time $T_n$ is $D_n$ and the image plane displacement at time $T_{n-1}$ is $D_{n-1}$, where $T_{n-1}$ is a detection time immediately preceding time $T_n$.

$$V_{im} = \frac{D_n - D_{n-1}}{T_n - T_{n-1}} \qquad (2)$$

However, if the image plane velocity $V_{im}$ and the velocity of the focus lens 5 show a strong non-linear relationship, a table value should be used for determining the image plane velocity $V_{im}$. In this embodiment of the invention, the defocus distance detection device 3 determines the image plane velocity $V_{im}$ as given in Eq. 2. It is equally effective to store the image plane displacements $D_n$ and $D_{n-1}$ detected by the defocus distance detection device 3 in the memory 12 and determine the image plane velocity $V_{im}$ in the control signal generator 13.

The control signal generator 13 determines the target position X of the focus lens 5 based on the image plane velocity $V_{im}$ and the offset defocus distance (OFF) detected by the defocus distance detection means 3 at the beginning of a control cycle. The target position X is a predicted ideal lens position where, based on the movement of a subject 10, the focus lens 5 will perfectly focus the image of the subject 10 on the composition plane 6.

Figure 4:
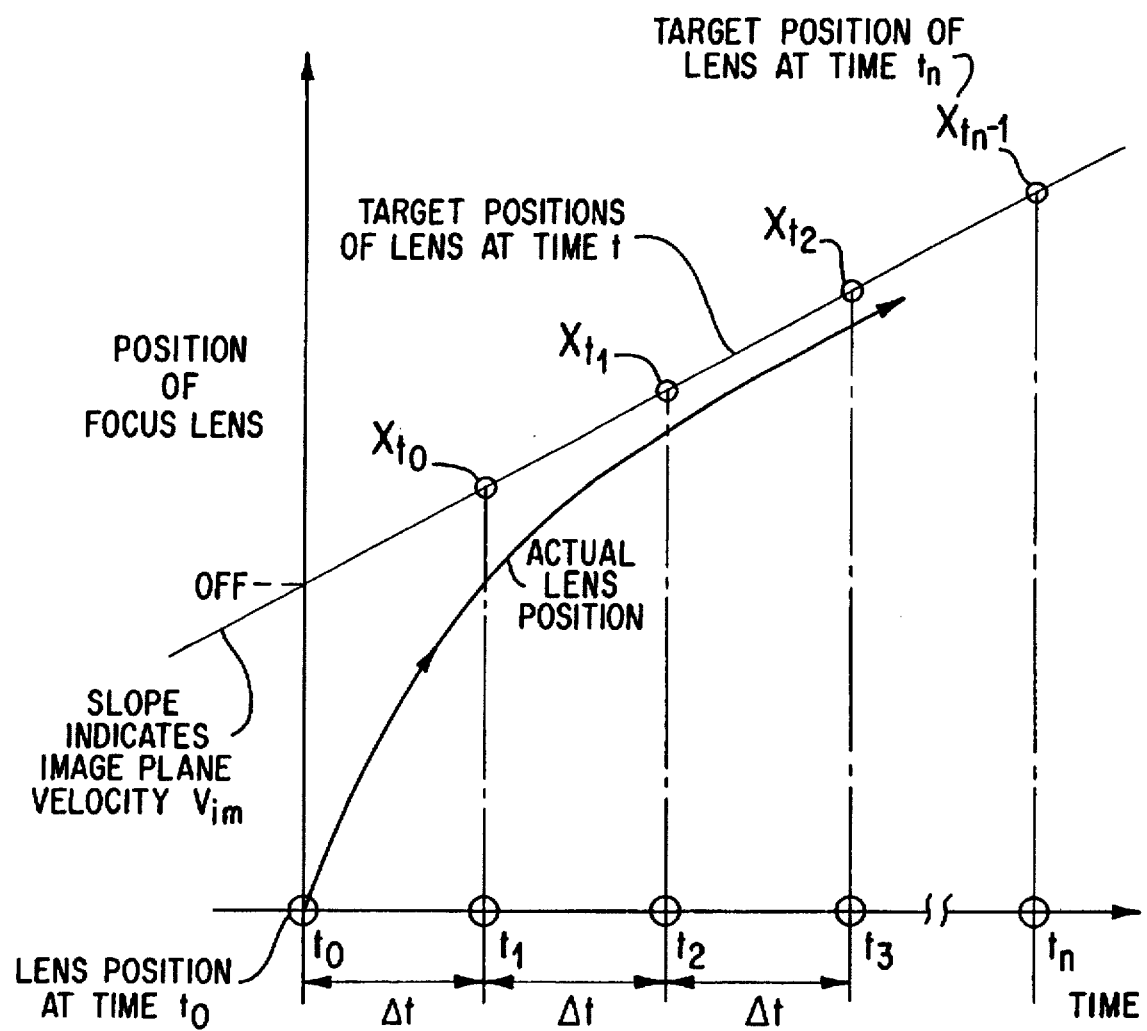
FIG. 4 is a graph depicting how the computation of the target position of the focus lens is determined in an embodiment of the present invention.

FIG. 4 graphically depicts how the target position X is determined. At the beginning of the control cycle, time $t_0$, the defocus distance detection device 3 detects the offset defocus distance (OFF). OFF is the distance separating the current lens position at $t_0$ and the ideal lens position at $t_0$. The sloping line nearest the top of FIG. 4 shows a series of predicted ideal lens positions for times after $t_0$. The slope of the line is equal to the image plane velocity $V_{im}$. The lens position is detected by the encoder 4 at time intervals $\Delta t$, which are approximately ten times shorter than the time interval between the detection of the defocus distance. This is because of time delays due to the charge transfer and storage restrictions on the sensors used in the defocus distance detection device 3. The target position X for each time t is the ideal lens position at time t+Δt as given by Eq. 3:

$$X = OFF + V_{im}(t+\Delta t) \tag{3}$$

In FIG. 4, for example, the target position at time $t_0$, $Xt_0$, is the predicted ideal lens position at time $t_0+\Delta t$, or $t_1$. The target position X of the nth trial is obtained as shown in Eq. 4:

$$X = OFF + V_{im}(n+1)\Delta t \tag{4}$$

The control signal generator 13 converts the target position X into a numerical value compatible with the output pulse from the encoder 4, for example, a value equivalent to the pulse number of the encoder 4. The image plane velocity $V_{im}$ is similarly converted to the target velocity V of the focus lens 5. In other words, the target velocity V is given as the lens velocity equivalent to the image plane velocity $V_{im}$.

Once the target position X and target velocity V are established, the control signal generator 13 determines the positional error ΔX of the focus lens 5. First, the control signal generator 13 learns the current position of the focus lens from the encoder 4. Then the positional error ΔX is obtained by determining the difference between the target position X and the current position.

Furthermore, the control signal generator 13 determines the current velocity of the focus lens 5 based on the difference between the current position of the focus lens 5, the position of the focus lens 5 at a prior time, and the time interval between the positions. If the current position of the focus lens 5 or the position of the focus lens 5 at the prior time do not exist, the current velocity of the focus lens 5 is assumed to be 0. The velocity error ΔV is obtained based on the difference between the target velocity V and the current velocity of the focus lens 5.

After the positional error ΔX and the velocity error ΔV are determined, the control signal sent to the motor controller 11 is determined as given by one of Eqs. 5–7:

$$P = \alpha \Delta V + \beta \sqrt{\Delta\ X} \tag{5}$$

$$P = \alpha \Delta V + \beta \sqrt{\Delta\ X} + f(n, \beta' \Delta X) \tag{6}$$

$$P = \alpha \Delta V + \beta \sqrt{\Delta\ X} + f(n, \beta' \Delta X) + \epsilon V \tag{7}$$

In this embodiment of the invention, the control of the motor 9 is executed by the so-called PWM control method in which the voltage applied to the motor 9 is modulated by a certain duty. In this case, P in Eqs. 5–7 corresponds to the duty. In this embodiment of the invention, the control signal output by the control signal generator 13 is an AC type duty which is expressed by a magnitude of 0 to 1 or −1 to +1. The motor controller 11 uses the control signal to determine the drive signal sent to the motor 9. Different types of drive actuators can be used in place of motor 9, such as an ultrasound wave motor, but in this embodiment the focus lens 5 is driven by an electric motor 9 and a gear box (not shown).

Control of the motor 9 is executed at a specified time interval, Δt, equal to the time interval between the detection of the position of the focus lens 5. Thus, the focus lens 5 can track a moving subject continuously by repeating the operation cycle described above.

For example in FIG. 4, a control signal is output to the motor controller 11 at times $t_0$, $t_1$, $t_2$ . . . tn. The offset defocus distance is detected approximately ten times less frequently than the control signals are output. Therefore, OFF is updated in FIG. 4 approximately at times $t_{10}$, $t_{20}$, $t_{10n}$. Accordingly, the control signals sent to the motor controller 11 at approximately times $t_0$–$t_9$ are based on the offset defocus distance and image plane velocity $V_{im}$ determined at time $t_0$.

Figure 5:
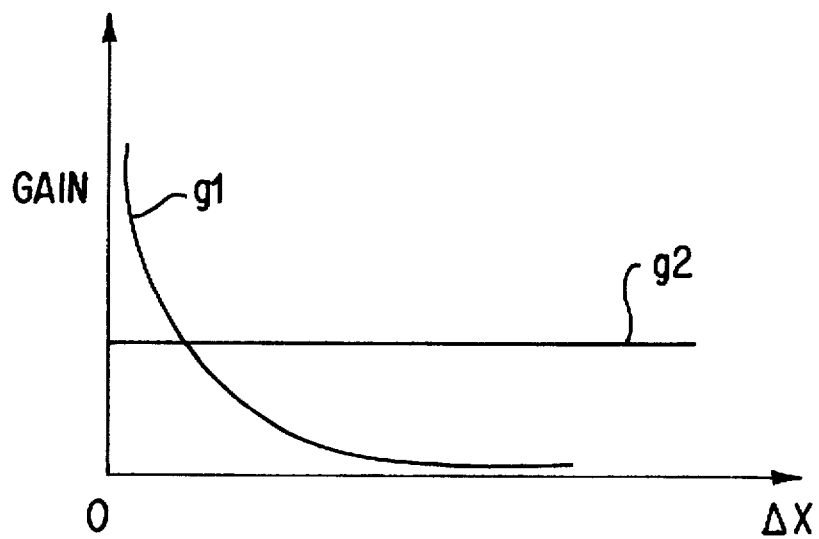
FIG. 5 shows the relationship between the gain as a function of positional error in an embodiment of the present invention and the gain as a function of positional error in a conventional control system.

To solve the stationary delay problems caused by the delay in detecting the offset defocus distance, Eqs. 5–7 give a much higher gain for the positional error ΔX in the vicinity of the target position X than the gain in the conventional control. The gain for positional error ΔX is the value obtained by dividing $\beta\sqrt{\Delta X}$, the second term in Eqs. 5–7, by the positional error ΔX. FIG. 5 shows a comparison of the gain from Eq. 5, g1, and the gain from the conventional control formula, linear gain g2. The horizontal axis in FIG. 5 is the positional error ΔX, and the vertical axis is the gain. The gain g1 of Eq. 5 increases rapidly as the focus lens 5 approaches the target position X. Thus, the magnitude of the control signal increases as the focus lens 5 approaches the ideal focus position (position which enables correct composition of the subject image on the composition plane 6). Therefore, as the focus lens 5 approaches closer to the target position X, stationary delay and intermittent lens movement are substantially lessened.

Figure 6:
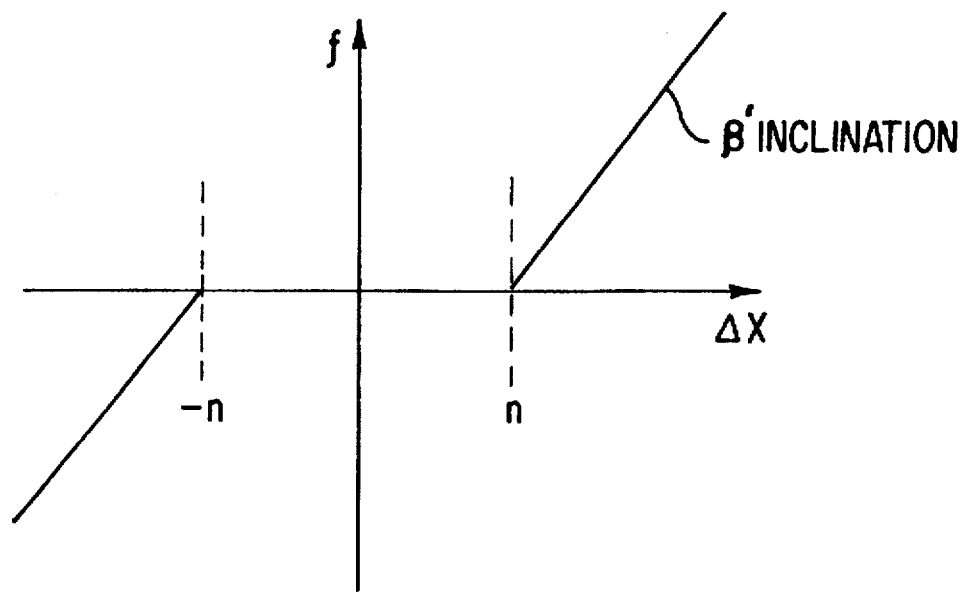
FIG. 6 shows the relationship between the third term in Eqs. 5 and 6 and the positional error of the focus lens.

Eq. 6 is obtained from Eq. 5 by adding a term to enable high speed driving of the motor 9 in a near open loop manner when the positional error ΔX is large. The linear positional error ΔX term f is added as the third term and is set as described in FIG. 6, for example. Until the positional error reaches +n or −n, the function f is 0, and when the positional error is greater than +n or smaller than −n, the value of f increases proportionally in the positive or negative direction based on the inclination β'. By adding the function f, the motor 9 is driven at a high speed in a near open loop manner when the focus lens 5 is so far away from the target position X (in the region right of +n or left of −n) that the momentum of the focus lens 5 causes no control problem. As the focus lens 5 approaches the target position X, the value of f drops to 0 and control reverts to that described above according to Eq. 5. With the use of Eq. 6, the time required for the focus lens 5 to approach the target position X can be shortened while avoiding overrun by the focus lens 5.

Eq. 7 is obtained from Eq. 6 by adding a fourth term to further correct for the stationary delay remaining in Eq. 6. Since the stationary delay of the focus lens 5 is proportional to the velocity of the subject 10, as explained before, adding an amount proportional to the target velocity V (εV) eliminates stationary delay in all target regions.

In the above embodiment, control is based on the square root of the positional error ΔX, but functions other than square root, Eq. 8 for example, are equally effective.

$$P = \alpha \Delta V + \beta e^{-\Delta x^2} \Delta X \tag{8}$$

It is natural to consider the image plane velocity $V_{im}$ as the target velocity V once the focus lens 5 catches up to the subject, but in the above embodiment the image plane velocity $V_{im}$ is also used as the target velocity V when the focus lens 5 is far away from the target position X, regardless of the actual movement of the focus lens 5. However, another method can be used in which the target position X and velocity V are assumed for each time interval to minimize the effects of temperature and other environmental changes on the lens drive actuator. Assumed target positions and velocities compensate for focus lens 5 response aberrations caused by voltage fluctuations or changes in the mechanical condition of the lens drive as a result of environmental conditions.

While the invention has been described in connection with the preferred embodiment, it should be understood that it is not intended to limit the invention to this embodiment. On the contrary, it is intended to cover all alternatives, modifications and equivalents that may be included within the spirit and scope of the invention as defined by the appended claims.

What is claimed is:

1. An automatic focus device comprising:
   a focus lens,
   a focus lens drive actuator coupled to the focus lens such that the focus lens is moved according to a drive signal, and
   a controller sending a non-linear drive signal to the focus lens drive actuator, detecting a position of the focus lens and detecting a distance the focus lens must move to focus an image on a composition plane,
   wherein the controller non-linearly controls the focus lens drive actuator, the controller controls the focus lens drive actuator based on a non-linear function.

2. An automatic focus device comprising:
   a focus lens,
   a focus lens drive actuator coupled to the focus lens such that the focus lens is moved according to a drive signal, and
   a controller sending a non-linear drive signal to the focus lens drive actuator, detecting a position of the focus lens and detecting a distance the focus lens must move to focus an image on a composition plane,
   wherein the controller non-linearly controls the focus lens drive actuator, the controller controls the focus lens drive actuator based on a non-linear function.

3. An automatic focus device comprising:
   a focus lens,
   a focus lens drive actuator coupled to the focus lens such that the focus lens is moved according to a drive signal, and
   a controller sending a non-linear drive signal to the focus lens drive actuator, detecting a position of the focus lens and detecting a distance the focus lens must move to focus an image on a composition plane,
   wherein the controller non-linearly controls the focus lens drive actuator, wherein the controller controls the focus lens drive actuator based on a non-linear function.

4. An automatic focus device comprising:
   a focus lens,
   a focus lens drive actuator coupled to the focus lens such that the focus lens is moved according to a drive signal, and
   a controller sending a drive signal to the focus lens drive actuator, detecting a position of the focus lens and detecting a distance the focus lens must move to focus an image on a composition plane,
   wherein the controller non-linearly controls the focus lens drive actuator, the controller controls the focus lens drive actuator based on:

$$P = \alpha \Delta V + \beta e^{-\Delta x^2} \Delta X$$

where P is a control signal, $\Delta V$ is a velocity error of the focus lens, $\Delta X$ is the positional error and $\alpha$ and $\beta$ are constants.

5. The device of claim 1, wherein the controller comprises:
   an encoder detecting the position of the lens,
   a defocus distance detection device detecting a value equivalent to a defocus distance of the focus lens,
   a memory communicating with the encoder and the defocus distance detection device and storing detected information,
   a control signal generator communicating with the memory and generating a control signal using one of stored and unstored detected information, and
   a motor controller communicating with the control signal generator and sending a drive signal to the focus lens drive actuator based on the control signal generated in the control signal generator.

6. A method for controlling a focus lens drive actuator comprising the steps of:
   detecting a first value corresponding to a defocus distance of a focus lens,
   detecting a second value corresponding to the velocity of a moving subject,
   detecting a current position of the focus lens,
   determining a target position for the focus lens based on the defocus distance of the focus lens, the velocity of the moving subject and the current position of the focus lens,
   determining a positional error of the focus lens,
   determining a non-linear control signal based on the positional error of the focus lens,
   outputting the control signal, and
   repeating the recited steps.

7. An automatic focus device comprising:
   lens means for focusing an image on an image plane,
   lens drive means for moving the lens means, and
   control means for controlling the lens drive means;
   wherein the control means non-linearly controls the lens drive means, the control means controls the lens drive means based on a non-linear function.

8. The device of claim 7, wherein the control means comprises:
   encoder means for detecting a position of the focus lens,
   defocus distance detection means for detecting a value corresponding to a defocus distance of the focus lens,
   memory means for storing detected information,
   control signal generator means for generating a control signal using one of stored and unstored detected information, and
   drive controller means for outputting a drive signal to the lens drive means based on the control signal generated by the control signal generator means.

9. An automatic focus device comprising:
   lens means for focusing an image on an image plane,
   lens drive means for moving the lens means, and
   control means for controlling the lens drive means;
   wherein the control means non-linearly controls the lens drive means, the control means controls the lens drive means based on a non-linear function.

10. An automatic focus device comprising:
    lens means for focusing an image on an image plane,
    lens drive means for moving the lens means, and
    control means for controlling the lens drive means;
    wherein the control means non-linearly controls the lens drive means, the control means controls the lens drive means based on:

$$P = \alpha\Delta V + \beta\sqrt{\Delta}\ X + f(n,\beta'\Delta X) + \epsilon V$$

where P is a control signal, ΔV is a velocity error of the focus lens, ΔX is a positional error, f is equal to 0 where −n≦ΔX≦+n, f is non-zero where ΔX is one of less than −n and greater than +n, V is the target velocity and α, β, β' and ε are constants.

11. An automatic focus device comprising:
   lens means for focusing an image on an image plane,
   lens drive means for moving the lens means, and
   control means for controlling the lens drive means,
   wherein the control means non-linearly controls the lens drive means, the control means controls the lens drive means based on:

$$P = \alpha\Delta V + \beta e^{-\Delta x^2}\Delta X$$

where P is a control signal, ΔV is a velocity error of the focus lens, ΔX is a positional error and α and β are constants.

12. The device of claim 1, wherein the controller controls the focus lens drive actuator based on:

$$P = \alpha\Delta V + \beta\cdot(\Delta X)^m$$

where P is a control signal, ΔV is a velocity error of the focus lens, ΔX is a positional error, m is a real number where 0<m<1 and α and β are constants.

13. The device of claim 2, wherein the controller controls the focus lens drive actuator based on:

$$P = \alpha\Delta V + \beta\cdot(\Delta X)^m + f(n,\beta'\Delta X)$$

where P is a control signal, ΔV is a velocity error of the focus lens, ΔX is a positional error, n and −n are the values of the positional error ΔX, above which, and below which, respectively, a momentum of the focus lens causes no control problem, f is equal to 0 where −n≦ΔX≦n, f is non-zero where ΔX is one of less than −n and greater than +n, m is a real number where 0<m<1 and α, β and β' are constants.

14. The device of claim 3, wherein the controller controls the focus lens drive actuator based on:

$$P = \alpha\Delta V + \beta\cdot(\Delta X)^m + f(n,\beta'\Delta X) + \epsilon V$$

where P is a control signal, ΔV is a velocity error of the focus lens, ΔX is a positional error, n and −n are the values of the positional error ΔX, above which, and below which, respectively, a momentum of the focus lens causes no control problem, f is equal to 0 where −n≦ΔX≦n, f is non-zero where ΔX is one of less than −n and greater than +n, V is the target velocity, m is a real number where 0<m<1 and α, β and β' are constants.

15. The device of claim 7, wherein the controller controls the focus lens drive actuator based on:

$$P = \alpha\Delta V + \beta\cdot(\Delta X)^m$$

where P is a control signal, ΔV is a velocity error of the focus lens, ΔX is a positional error, m is a real number where 0<m<1 and α and β are constants.

16. The device of claim 9, wherein the controller controls the focus lens drive actuator based on:

$$P = \alpha\Delta V + \beta\cdot(\Delta X)^m + f(n,\beta'\Delta X)$$

where P is a control signal, ΔV is a velocity error of the focus lens, ΔX is a positional error, f is equal to 0 where −n≦ΔX≦n, n and −n are the values of the positional error ΔX, above which, and below which, respectively, a momentum of the focus lens causes no control problem, f is non-zero where ΔX is one of less than −n and greater than +n, m is a real number where 0<m<1 and α, β and β' are constants.

\* \* \* \* \*